United States Patent [19]
Smith et al.

[11] Patent Number: 5,698,688
[45] Date of Patent: *Dec. 16, 1997

[54] ALDEHYDE-MODIFIED CELLULOSIC FIBERS FOR PAPER PRODUCTS HAVING HIGH INITIAL WET STRENGTH

[75] Inventors: David Jay Smith, Montgomery; Jimmie Ed Ruth, Jr., Forest Park, both of Ohio

[73] Assignee: The Procter & Gamble Company, Cincinnati, Ohio

[*] Notice: The term of this patent shall not extend beyond the expiration date of Pat. No. 5,656,746.

[21] Appl. No.: 624,827

[22] Filed: Mar. 28, 1996

[51] Int. Cl.$^6$ .................. C08B 3/00; D06M 11/00; C08L 1/00
[52] U.S. Cl. .............. 536/56; 536/63; 8/116.1; 8/120; 8/129; 106/163.1; 106/169
[58] Field of Search .................. 536/63, 56, 119; 8/116.1, 120, 129; 106/163.1, 169; 162/177, 182

[56] References Cited

U.S. PATENT DOCUMENTS

| | | | |
|---|---|---|---|
| 3,505,312 | 4/1970 | Malm et al. | 536/32 |
| 3,692,555 | 9/1972 | Aono et al. | 117/33.3 |
| 3,708,305 | 1/1973 | Koyanagi et al. | 96/115 |
| 3,712,886 | 1/1973 | Koyanagi et al. | 536/43 |
| 3,870,702 | 3/1975 | Koyanagi et al. | 536/43 |
| 3,933,746 | 1/1976 | Steele | 536/43 |
| 4,026,928 | 5/1977 | Chaudhary et al. | 562/408 |
| 4,177,073 | 12/1979 | Hata et al. | 430/188 |
| 4,226,981 | 10/1980 | Onda et al. | 536/66 |
| 4,283,553 | 8/1981 | Ivanchev et al. | 560/176 |
| 4,820,307 | 4/1989 | Welch et al. | 8/120 |
| 4,840,875 | 6/1989 | Kunichika et al. | 430/309 |
| 4,939,200 | 7/1990 | Stack et al. | 524/501 |
| 4,983,401 | 1/1991 | Eichel et al. | 424/473 |
| 5,026,559 | 6/1991 | Eichel et al. | 424/458 |
| 5,028,655 | 7/1991 | Stack | 524/522 |
| 5,034,501 | 7/1991 | Ura et al. | 528/263 |
| 5,102,668 | 4/1992 | Eichel et al. | 424/490 |
| 5,104,923 | 4/1992 | Steinwand et al. | 524/461 |
| 5,158,611 | 10/1992 | Ura et al. | 106/499 |
| 5,171,580 | 12/1992 | Iamartino et al. | 424/490 |
| 5,238,686 | 8/1993 | Eichel et al. | 424/461 |

FOREIGN PATENT DOCUMENTS

| | | |
|---|---|---|
| 1115935 | 6/1968 | United Kingdom . |
| 1192797 | 5/1970 | United Kingdom . |

OTHER PUBLICATIONS

JA-7129743-R, published Aug. 30, 1971, Abstract only, Derwent Publications.

J5 4151-906, published Nov. 29, 1979, Abstract only, Derwent Publications.

J6 1094-045-A, published Dec. 5, 1986; Abstract only, Derwent Publications.

J0 1307-743-A, published Dec. 12, 1989; Abstract only, Derwent Publications.

Laguna et al., "Coating II Comparative Study of Filmogens & Plasticizens on Coating in Rotary Machine", *Ann. Pharm. Francaises*, vol. 32, #12, pp. 641–655 (1974).

Andrews et al., "Efficient Ester Crosslink Finishing For Formaldehyde–free Durable Press Cotton Fabrics", *Am. Dyest. Rep.*, vol. 78, #6, pp. 16, 18, 23 (1989).

Lenikova et al, "Org. Peroksidy Gomoliticheskie Reakts, Ikh Uchastiem". Rakhimov, A.1, pp. 35–50 (1989).

Brown et al., "Calysis of 1,2,3,4–Butanetetracarboxylic Acid in the Durable Press Finishing of Cotton Textile", *Pap. Int: Conf. Exhib.*, AATCC, pp. 168–185 (1991).

Docket No. 6045, Serial No. 08/624,764, Inventors David J. Smith and Michael M. Headlam, Filing Date Mar. 28, 1996.

*Primary Examiner*—Nathan M. Nutter
*Attorney, Agent, or Firm*—Loretta J. Henderson; Carl J. Roof; E. Kelly Linman

[57] ABSTRACT

Modified cellulosic fibers are formed by (1) esterifying cellulosic fibers with a 1,2-disubstituted alkene that has at least one carboxylic acid group reactive with cellulosic hydroxyl groups and (2) oxidizing the esterified fibers to form aldehyde groups. The modified fibers are useful in paper products, which tend to have temporary wet strength. Strength additives may be included in the paper product to impart a higher level of temporary wet strength or permanent wet strength.

25 Claims, No Drawings

ALDEHYDE-MODIFIED CELLULOSIC FIBERS FOR PAPER PRODUCTS HAVING HIGH INITIAL WET STRENGTH

FIELD OF THE INVENTION

This invention relates to modified cellulosic fibers, more particularly such fibers which are useful for providing paper products having a good initial wet strength.

BACKGROUND OF THE INVENTION

Wet strength is a desirable attribute of many disposable paper products that come into contact with water in use, such as napkins, paper towels, household tissues, disposable hospital wear, etc. In particular, it is often desirable that such paper products have sufficient wet strength to enable their use in the moistened or wet condition. Thus, the product should resist tearing, ripping, disintegration and the like such that it substantially maintains its integrity during the intended use. For example, moistened tissue or towel may be used for body or other cleaning. Unfortunately, an untreated assemblage of unmodified cellulosic fibers will typically lose 95% to 97% of its strength when saturated with water such that it cannot usually be used in the moistened or wet condition.

As recognized in the art, paper products develop dry strength in part due to interfiber hydrogen bonding. When the paper product is wetted, water disrupts the hydrogen bonds and, as a consequence, lowers the strength of the paper product. Historically, wet strength of paper products has been increased primarily by two approaches. One approach is to prevent water from reaching and disrupting the hydrogen bonds, for example, by coating the paper product. Another approach is to incorporate additives in the paper product which contribute toward the formation of interfiber bonds which are not broken or, for temporary wet strength, which resist being broken, by water. The second approach is commonly the technique of choice, especially for tissue products. In this latter approach, a water soluble wet strength resin may be added to the pulp, generally before the paper product is formed (wet-end addition). The resin generally contains cationic functionalities so that it can be easily retained by the cellulosic fibers, which are naturally anionic.

A number of resins have been used or disclosed as being particularly useful for providing wet strength to paper products. Certain of these wet strength additives have resulted in paper products with permanent wet strength, i.e., paper which when placed in an aqueous medium retains a substantial portion of its initial wet strength over time. Exemplary resins of this type include urea-formaldehyde resins, melamine-formaldehyde resins and polyamide-epichlorohydrin resins. Such resins have limited wet strength decay.

Therefore, manufacturers have more recently added temporary wet strength additives to paper products for which wet strength is sufficient for the intended use, but which then decays upon soaking in water. Decay of the wet strength facilitates flow of the paper product through septic systems. Numerous approaches for providing paper products claimed as having good initial wet strength which decays significantly over time have been suggested. For example, U.S. Pat. No. 3,096,228, Day et al., issued Jul. 2, 1983, U.S. Pat. No. 3,556,932, Coscia et al., issued Jan. 19, 1971; U.S. Pat. No. 3,740,391, Williams et al., issued Jun. 19, 1973; and U.S. Pat. No. 4,605,702, Guerro et al., issued Aug. 12, 1986, and U.S. Pat. No. 4,675,394, Solarek, et al.., issued June 23, 1987, suggest various approaches for achieving temporary wet strength with polymers or other compounds.

It is also known to modify cellulosic fibers to contain aldehyde groups, for example, as described by T. G. Gafurov et al., Strukt. Modif. Khlop. Tsellyul., Vol.3, pp. 131–135 (1966).

While the art has provided a variety of paper products having initial wet strength, none has provided paper products in the manner of the present invention. It has now been found that cellulosic fibers that are reacted with 1,2-disubstituted carboxylic alkenes followed by oxidation impart wet strength to paper products containing the resultant modified fibers.

It is an object of this invention to provide cellulosic fibers which are modified to contain aldehyde groups, and paper products, including paper tissue products such as toilet tissue, comprising such fibers. It is a further object to provide paper products having wet strength. Yet another object of this invention is to provide paper products having temporary wet strength.

SUMMARY OF THE INVENTION

The present invention relates to cellulosic fibers that are modified to contain aldehyde groups. The present invention also relates to paper products containing such fibers. The modified fibers tend to provide paper products having a high initial wet tensile strength (e.g., at least about 80 g/inch, preferably at least about 120 g/inch), which is temporary.

Preferred modified cellulosic fibers of this invention are formed by oxidizing cellulosic fibers which have been reacted through a portion of its hydroxyl groups with a carboxylic group of a 1,2-disubstituted carboxylic alkene to form covalent linkages. The alkene preferably has at least one other carboxyl group such that the alkene is capable of forming an anhydride.

DETAILED DESCRIPTION OF THE PREFERRED EMBODIMENTS

The modified cellulosic fibers of the present invention can be formed by oxidizing cellulosic fibers that have been reacted with a 1,2 disubstituted alkene containing at least one carboxylic functional group capable of reacting with the cellulosic hydroxyl groups to form covalent linkages (the 1,2 disubstituted alkene is alternatively referred to herein as "carboxylic alkene". The cellulosic fibers that have been reacted with the carboxylic alkene yet not oxidized are herein after alternatively to as "intermediate cellulosic fibers" or "intermediate cellulosic fiber reaction product".

The intermediate cellulosic fibers can be derived from a variety of cellulosic fibers. Cellulosic fibers of diverse natural origin are applicable to the invention. Digested fibers from softwood (derived from coniferous trees), hardwood (derived from both deciduous trees) or cotton linters are preferably utilized. Fibers from Esparto grass, bagasse, kemp, flax, and other lignaceous and cellulosic fiber sources may also be utilized as raw material in the invention. The optimum cellulosic fiber source utilized in conjunction with this invention will depend upon the particular end use contemplated. Generally wood pulps will be utilized. Applicable wood pulps include chemical pulps, such as Kraft (i.e., sulfate) and sulfite pulps as well as mechanical pulps including, for example, groundwood, thennomechanical pulp (i.e., TMP) and chemithermomechanical pulp (i.e., CTMP). Chemical pulps, however, are preferred since they impart a superior tactile sense of softness to tissue sheets made therefrom. Completely bleached, partially bleached and unbleached fibers are applicable. It may frequently be desired to utilize bleached pulp for its superior brightness and consumer appeal. For products such as paper tissue, paper towels and absorbent pads for diapers, sanitary napkins, catamenials, and other similar absorbent paper products, it is especially preferred to utilize fibers from northern softwood pulp due to its premium strength characteristics.

Also useful in the present invention are cellulosic fibers derived from recycled paper, which can contain any or all of the above categories as well as other non-fibrous materials such as fillers and adhesives.

The cellulosic fibers are reacted with a 1,2 disubstituted alkene containing at least one carboxylic functional group to form the intermediate fibers. The carboxylic functional group may be, for example, a carboxylic acid group (—COOH) or an acid amide group (—$CONH_2$), and is preferably a carboxylic acid group. The carboxylic acid group reacts with a cellulosic hydroxyl group to form an ester linkage, as does an acid amide group. However, the acid amides are far less reactive than the carboxylic acid groups and are therefore less preferred.

By "1,2-disubstituted," it is meant that each of the doubly bonded carbons is singly bonded to one carbon atom other than the doubly bonded carbon atom, and to a hydrogen atom (—HC═CH—). Without intending to be bound by theory, it is believed that if each doubly bonded carbon atom is not bonded to at least one carbon atom, formaldehyde undesirably tends to form during the oxidation of the intermediate cellulosic fibers. On the other hand, if more than one carbon atom is bonded to each doubly bonded carbon atom, ketones are undesirably formed when the intermediate cellulosic fibers are oxidized. The carboxylic alkene may contain one or more carbon-carbon double bonds and may contain other multiple bonds.

The 1,2-disubstituted carbon-carbon double bond is preferably in a cyclic structure. Cyclic alkenes tend to lose fewer aldehyde groups during oxidation of the intermediate cellulosic fibers, relative to acyclic alkenes. Without intending to be bound by theory, it is believed that the number of aldehyde groups should be maximized in order to maximize the number of hemi-acetal groups and/or N-acylhemiaminal groups in the final paper product, and thus to maximize the wet strength of the paper product containing the modified cellulosic fibers.

In preferred embodiments, the carboxylic alkene is a polycarboxylic compound that coming at least one additional carboxylic functional group such that the compound is capable of forming an anhydride. Such polycarboxylic compounds tend to more readily react with the hydroxyl groups of the cellulosic fibers to form the intermediate cellulosic fibers such that yields of the modified cellulosic fibers of the present invention are higher than when the carboxylic alkene is not capable of forming an anhydride. As used herein, "anhydride" refers to chemical compounds derived from an acid by the elimination of a molecule of water. The second carboxylic functional group may suitably be a carboxylic acid group or an acid amide group. Thus, the carboxylic alkene may be capable of forming a dicarboxylic acid anhydride or a cyclic imide. It is preferred that each of the carboxylic groups be a carboxylic acid group.

More preferably, the carbon atoms of the carboxylic groups of the polycarboxylic compound are separated by 2–3 carbon atoms in order to facilitate the formation of the anhydride (i.e., the carboxylic groups are positioned 1,2 or 1,3 relative to one another). Most preferably, the carbon atoms of the carboxyl group are separated by 2 carbon atoms since the 1,2 polycarboxylic compounds form anhydrides more readily at lower temperatures than the 1,3 polycarboxylic compounds.

The 1,2-disubstituted alkene group and the carboxylic functional group(s) are preferably unconjugated. Without intending to be bound by theory, it is believed that Michel Addition (1,4) can occur to the alkene bond during the esterification reaction where the alkene group and the carboxylic group(s) are conjugated. This addition reaction would destroy the alkene bond and thus negate aldehyde formation during oxidation of the intermediate cellulosic fibers.

Preferred carboxylic alkenes are water soluble so as to enable a water-based process. As used herein, "water soluble" includes the ability of a material to be dissolved, dispersed, swollen, hydrated or similarly admixed in water. Similarly, as used herein, reference to the phrase "substantially dissolved," "substantially dissolving" and the like refers to the dissolution, dispersion, swelling, hydration and the like admixture of a material in a liquid medium (e.g., water). The mixture typically forms a generally uniform fluid mixture having, to the naked eye, one physical phase.

Suitable carboxylic alkenes include, but are not limited to, cis-1,2,3,6-tetrahydrophthalic acid and 1,2,3,6-tetrahydrophthalamic acid. Derivatives of such compounds, e.g., substituted analogs thereof wherein any of the carbon atoms other than the doubly bonded carbon atoms are mono- or poly- substituted, are also suitable for use herein. A variety of substituent groups may be present. However, the substituent groups should not provide steric hindrance or electronic deactivation of the esterification step such that the rate of esterification is decreased. For reasons of availability and rapid reaction times, the carboxylic alkene is preferably cis-1,2,3,6-tetrahydrophthalic acid.

The intermediate cellulosic fibers can be formed by a process including the steps of preparing a fluid mixture of the carboxylic alkene and a liquid medium; contacting the cellulosic fibers with the fluid mixture so as to form treated fibers; and reacting at least a portion of the cellulosic hydroxyl groups with a carboxylic functional group of the alkene to form a covalent linkage. The resultant intermediate cellulosic fibers are then oxidized as described herein below to form aldehyde groups.

Suitable liquid media are those that can substantially dissolve or disperse the carboxylic alkene, preferably that provides maximum solubility of the carboxylic alkene in the fluid mixture. The liquid medium may contain one or more solvents for the carboxylic alkene compound. Suitable liquid media include water, pyridine, other aprotic solvents, and mixtures thereof. Water is the preferred liquid medium.

The carboxylic alkene and liquid medium can be combined and mixed together by any suitable method such as are known in the art of forming solutions or dispersions. It is typically preferred to maximize the concentration of the carboxylic alkene in the fluid mixture in order to reduce the time and energy required to evaporate the liquid medium to provide the modified cellulosic fibers of the present invention. Heating can be employed to enhance solubility of the carboxylic alkene in the liquid medium. For example, the fluid mixture may be heated to temperatures of from about 50° C. to about 100° C.

The cellulosic fibers can be contacted with the fluid mixture containing the carboxylic alkene by a combination of one or more techniques such as are known in the art of papermaking, e.g., immersion, mixing, dumping, spraying, dipping and squeezing and the like.

In a preferred embodiment, the cellulosic fibers are contacted with the fluid mixture at the wet end of a paper machine in the pulp process of making paper sheets (i.e., wet laid papermaking process). According to this embodiment, the pulp sheet is sprayed with the fluid mixture at the wet end of the process. For conventional commercial processes, the sheet should be greater than about 20% consistency, preferably from 20–50% consistency, to maintain adequate web strength. It has surprisingly been found that the dry tensile and initial total wet tensile strength of paper sheets of the present invention increase with an increase in the basis weight of the pulp sheet which is sprayed. In a particularly preferred embodiment, the pulp sheet has a basis weight of from about 180 to about 260 lb/3000 ft$^2$. The pulp sheet is then dried and heated as described herein, beyond to at least the point of no further weight loss by evaporation to effect reaction between the cellulosic fibers and the carboxylic alkene.

In an alternative embodiment, the cellulosic fibers and the fluid mixture containing the carboxylic alkene are contacted by forming a slurry of the cellulosic fibers in the fluid mixture (e.g., by immersing and mixing). Thus, the fibers and alkene may be contacted by including the alkene in the papermaking furnish of a wet laid papermaking process such as are known in the art.

The fluid mixture containing the carboxylic alkene is prepared, and brought into contact and reacted with the cellulosic fibers to provide a degree of substitution on the cellulose molecule of from about 0.25 to about 1.5, more preferably from about 0.5 to about 1.0, most preferably about 1.0 (i.e., from about 0.25 to about 1.5 mole %, preferably from about 0.5 to about 1.0 mole %, most preferably about 1.0 mole % cellulosic hydroxyl groups, calculated on a cellulose anhydroglucose molar basis, will be reacted with a carboxyl group of the alkene to form covalent linkages).

The treated fibers are heated to a temperature and for a time sufficient to substantially remove the liquid medium and to cause the cellulosic hydroxyl groups and a carboxylic functional group of the alkene to react to form covalent linkages. Where the preferred carboxylic compounds, the polycarboxylic compounds, are used, the treated fibers are heated to a temperature and for a time sufficient to substantially remove the liquid medium from the fibers, to form the anhydride of the polycarboxylic compound, and to cause the covalent bond formation between the carboxylic alkene and the cellulosic hydroxyl groups. Where water is used as the liquid medium, the treated fibers are preferably heated to at least about 100° C. to evaporate the water. Evaporation and reaction are typically caused by heating the treated fibers to a temperature in the range of from about 120° C.–180° C. for a period of about 30 minutes to 2 hours.

In a preferred embodiment, the covalent bond formation is catalyzed by a suitable catalyst. The catalyst tends to result in a faster reaction rate, less decomposition of the cellulosic fibers, and a higher yield of the intermediate cellulosic fibers. Any catalyst such as are known in the art of esterification may be used. A preferred catalyst is sodium hypophosphite (NaH$_2$PO$_2$), which tends to provide higher yields and to minimize decomposition of the cellulosic fibers at higher reaction temperatures. The use of sodium hypophosphite as an esterification catalyst has been described, for example, in U.S. Pat. No. 4,820,307, issued to C. M. Welch, incorporated herein by reference. The catalyst is suitably included in the fluid mixture containing the carboxylic alkene.

Where the preferred 1,2-disubstituted alkenes are used, the resultant intermediate cellulosic fibers with a degree of substitution of 1.0 have the following structure:

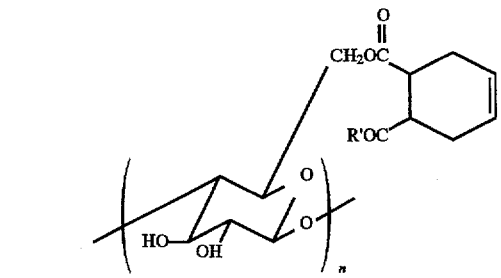

wherein R' is OH or NH$_2$; and
n is the degree of polymerization (i.e., DP) of the cellulose fibers and is at least one (1), preferably 1–10,000.

The resultant intermediate cellulosic fibers are then oxidized to form the modified cellulosic fibers of the present invention. Prior to oxidation, the intermediate cellulosic fibers are preferably washed to remove any residual, unreacted carboxylic compound. The fibers may suitably be washed with a dilute aqueous solution era base, e.g., aqueous sodium carbonate.

Oxidation is accomplished by contacting the intermediate cellulosic fibers with an oxidizing agent under conditions to cause the formation of aldehyde groups on the residue of the carboxylic alkene. Oxidation is preferably accomplished by forming a mixture, e.g., a slurry or other dispersion, of the intermediate cellulosic fibers and a suitable liquid medium and introducing an oxidizing agent into the mixture under conditions such that the formation of aldehyde groups occurs on the residue of the carboxylic alkene.

Suitable liquid media are those that do not significantly interfere with the oxidation reaction and which may assist in dispersing the fibers. Exemplary liquid media include water, organic solvents such as acetic acid, lower alcohols, chlorinated hydrocarbons, and mixtures thereof. Water is the preferred liquid medium. The amount of the liquid medium and the fibers in the mixture may vary over a wide range. Typically, the mixture comprises from about 0.1 to about 50 weight % of the fibers and from 99.9 to about 50 weight % of the liquid medium. Thus, the mixture can be low consistency (e.g., about 1–3.5% fiber/99–96.5% liquid medium), medium consistency (e.g., about 8–16% fiber/92–84% aqueous liquid medium), or high consistency (e.g., about 20–50% fiber/50–80% aqueous liquid medium).

Suitable oxidizing agents include ozone and potassium permanganate. Ozone is the preferred oxidizing agent. Ozone is the preferred oxidation agent for reasons of reaction efficiency, simplicity, economics, environmental impact, and safety.

Ozone oxidation can be accomplished by introducing ozone into the mixture, e.g., by injecting the gas under pressure into the mixture. Although the flow rate and pressure of the ozone may vary over a wide range, exemplary conditions include a flow rate of about 8.0 liters/minute and a flow pressure of about 8 psig. The mixture is preferably cooled to a temperature as low as possible without freezing the mixture (e.g., to temperatures down to about 0° C.) in order to maximize the solubility of the ozone in the mixture. The oxidation reaction is typically completed by introducing the ozone under the foregoing conditions for a period ranging from about 30 to about 60 minutes.

During the oxidation step, aldehyde groups are formed on the carboxylic alkene residue of the intermediate cellulosic fibers. Without intending to be bound by theory, it is believed that at least a potion of the aldehydes are present on the fiber surface to facilitate interfiber bending during the papermaking process. Aldehyde groups may also be formed in the fiber interior and/or in the fiber wall (i.e., intrafiber aldehyde groups). The formation and quantification of aldehyde groups can be determined by known analytical techniques such as infrared analysis. Alternatively, the presence of aldehyde groups is evidenced by an increase in the wet strength of a paper product formed from the modified fibers, relative to a corresponding paper product formed from non-modified fibers. In general, for a given fiber weight, oxidizing agent concentration, and set of reaction conditions, oxidation increases with increasing time of exposure to the oxidizing agent. Thus, the degree of oxidation can be readily optimized for a given fiber weight by quantifying the aldehyde content as a function of time by any of the foregoing methods. It will be desired to avoid the over oxidation of the fibers to cause significant formation of carboxylic acid groups, which can be detected and quantified using the same techniques.

The modified fibers also contain hydroxyl groups. Without intending to be bound by theory, it is believed that the hydroxyl groups react with the aldehyde groups to confer temporary wet strength to the paper product as further described herein.

Where the preferred 1,2-disubstituted alkenes are used, the resultant modified fibers with a degree of substitution of 1.0 have the following structure:

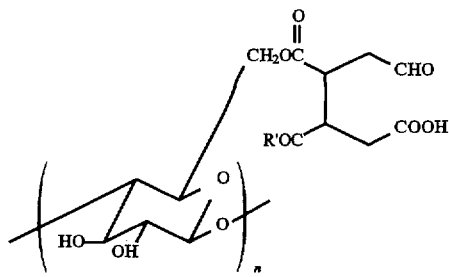

wherein R' and n are as defined above.

The resultant modified cellulosic fibers of the invention can be recovered by removing the bulk of the liquid medium and then drying the fibers. For example, the modified fibers may be sheeted after optional further dilution and using conventional wet laid papermaking processes, and then dried. Accelerated drying may be accomplished, for example, by heating to a temperature and for a time sufficient to substantially remove the liquid medium, e.g., heating to about 85° C. to about 125° C. to achieve substantially constant weight. The modified cellulosic fibers can thus be collected for later use in a papermaking process. Alternatively, the mixture containing the modified cellulosic fibers can be incorporated into a continuous paper making process such as are known in the art, e.g., in the papermaking famish of a wet laid paper making process, without recovering the fibers.

The modified cellulosic fibers of the present invention are useful for a wide variety of paper and paper products. As used herein, the terms "paper" and "paper products" include sheet-like masses and molded products containing the modified cellulosic fibers of the invention.

In addition to the modified cellulosic fibers herein described, the paper products of the present invention may contain conventional or other papermaking materials. For example, the paper products may contain conventional papermaking fibers, including chemically modified or unmodified cellulosic fibers. The paper products may also contain non-cellulosic fibrous polymeric material characterized by having hydroxyl groups attached to the polymer backbone, for example glass fibers and synthetic fibers modified with hydroxyl groups. Other fibrous material, e.g., synthetic fibers, such as rayon, polyethylene and polypropylene fibers, can also be utilized in combination with natural cellulosic fibers or other fibers containing hydroxyl groups. Fibrous material having hydroxyl groups may be chemically modified to contain aldehyde groups in the manner of the cellulosic fibers of the present invention and incorporated into the paper product. Mixtures of any of the foregoing fibers may be used in combination with the modified cellulosic fibers of the present invention.

Conventional paper-making additives such as are known in the art include, for example, dry strength and wet strength additives, retention aids, and paper softeners. As will be understood by one having ordinary skill in the art, wet strength resins may be selected to impart temporary or permanent wet strength. For example, it has been found that polyacrylamides tend to impart a more permanent wet strength to paper products formed from the modified cellulosic fibers of the present invention.

The paper products are typically formed by a wet laid paper making process. Wet laid paper making processes typically include the steps of providing a slurry containing the papermaking fibers (the slurry is alternatively referred to herein as a paper making furnish), depositing the slurry of fibers on a substrate such as a formation forming wire (e.g., a Fourdrinier wire), and setting the fibers into a sheeted form while the fibers are in a substantially unflocculated condition. The step of setting the fibers into sheeted form may be performed by allowing the fluid to drain and pressing the fibers against the formation wire (dewatering), for example, with a screened roll, such as a cylindrical Dandy Roll. Once set, the fibrous sheet is then dried and optionally compacted as desired.

The drying step removes water and any other liquids so as to develop the wet strength of the paper product. Drying may be accomplished by subjecting the paper product to elevated temperatures, e.g., in the range of from 85° C.–125° C., for a time sufficient to achieve the desired level of dryness, typically less than about 10% water and/or other liquids. Typical drying conditions are a temperature of from 20° C. to about 100° C. Without intending to be bound or otherwise limited by theory, it is believed that upon drying of the paper product comprising the modified cellulosic fibers of the present invention, the aldehyde groups of the modified cellulosic fibers form hemi-acetal and/or N-acylhemiaminal groups with proximal cellulosic hydroxyl groups. These hemi-acetal groups serve to impart dry strength and an initial wet strength to the paper product, yet are readily decomposed by water. Thus, when the paper product is exposed to aqueous fluids, the hemi-acetal and/or N-acylhemiaminal groups revert to aldehyde groups to provide a temporary wet strength to the paper product.

The present invention is particularly adapted for paper products which are to be disposed into sewer systems, such as toilet tissue. However, it is to be understood that the present invention is applicable to a variety of paper products including, but not limited to disposable absorbent paper products such as those used for household, body, or other cleaning applications and those used for the absorption of body fluids such as urine and menses. Exemplary paper products thus include tissue paper including toilet tissue and facial tissue, paper towels, absorbent materials for diapers, feminine hygiene articles including sanitary napkins, pantiliners and tampons, adult incontinent articles and the like, and writing paper.

With regard to tissue paper, the modified cellulosic fibers of the present invention can be used in any type of tissue paper construction. For example, tissue paper of the present invention can be homogeneous or multi-layered construction; and tissue paper products made therefrom can be of a single-ply or multi-ply construction. The tissue paper preferably has a basis weight of between about 10 g/m$^2$ and about 65 g/m$^2$, and density of about 0.6 g/cm$^3$ or less. More preferably, the basis weight will be about 40 g/m$^2$ or less and the density will be about 0.3 g/cm$^3$ or less. Most preferably, the density will be between about 0.04 g/cm$^3$ and about 0.2 g/cm$^3$. See Column 13, lines 61–67, of U.S. Pat. No. 5,059,282 (Ampulski et al), issued Oct. 22, 1991, which describes how the density of tissue paper is measured. (Unless otherwise specified, all mounts and weights relative to the paper are on a dry basis.) The tissue paper may be conventionally pressed tissue paper, pattern densified tissue paper, and uncompacted, nonpattern-densified tissue paper. These types of tissue paper and methods for making such paper are well known in the art and are described, for example, in U.S. Pat. No. 5,334,286, issued on Aug. 2, 1994 in the names of Dean V. Phan and Paul D. Trokhan, incorporated herein by reference in its entirety.

EXPERIMENTAL

Strength Tests

The paper products are aged prior to tensile testing a minimum of 24 hours in a conditioned room where the temperature is 73° F.±4° F. (22.8° C.±2.2° C.) and the relative humidity is 50%±10%.

1. Total Dry Tensile Strength ("TDT")

This test is performed on one inch by five inch (about 2.5 cm×12.7 cm) strips of paper (including handsheets as described above, as well as other paper sheets) in a conditioned room where the temperature is 73° F.±4° F. (about 28° C.±2.2° C.) and the relative humidity is 50%±10%. An electronic tensile tester (Model 1122, Insiron Corp., Canton, Mass.) is used and operated at a crosshead speed of 2.0 inches per minute (about 1.3 cm per min.) and a gauge length of 4.0 inches (about 10.2 cm). Reference to a machine direction means that the sample being tested is prepared such that the 5" dimension corresponds to that direction. Thus, for a machine direction (MD) TDT, the strips are cut such that the 5" dimension is parallel to the machine direction of manufacture of the paper product. For a cross machine direction (CD) TDT, the strips are cut such that the 5" dimension is parallel to the cross-machine direction of manufacture of the paper product. Machine-direction and cross-machine directions of manufacture are well known terms in the art of paper-making.

The MD and CD tensile strengths are determined using the above equipment and calculations in the conventional manner. The reported value is the arithmetic average of at least eight strips tested for each directional strength. The TDT is the arithmetic total of the MD and CD tensile strengths.

2. Wet Tensile

An electronic tensile tester (Model 1122, Instron Corp.) is used and operated at a crosshead speed of 0.5 inch (about 1.3 cm) per minute and a gauge length of 4.0 inch (about 10.2 cm), using the same size strips as for TDT. The strip is wetted with distilled water at about 20° C. for the desired soak time, and then measured for tensile strength. As in the case of the TDT, reference to a machine direction means that the sample being tested is prepared such that the 5" dimension corresponds to that direction.

The MD and CD wet tensile strengths are determined using the above equipment and calculations in the conventional manner. The reported value is the arithmetic average of at least eight strips tested for each directional strength. The total wet tensile strength for a given soak time is the arithmetic total of the MD and CD tensile strengths for that soak time. Initial total wet tensile strength ("ITWT") is measured when the paper has been saturated for about 5±0.5 seconds.

The following non-limiting examples are provided to illustrate the present invention. The scope of the invention is to be determined by the claims which follow.

Preparation of paper web of ozone oxidized, cis-1,2,3,6-tetrahydrophthalic acid ester of cellulosic fibers EXAMPLE 1 (handsheets)

Handsheets are made essentially according to TAPPI standard T205 with the following modifications:

(1) tap water, adjusted to a desired pH, generally between 4.0 and 4.5, with $H_2SO_4$ and/or NaOH is used;

(2) the sheet is formed on a polyester wire and dewatered by suction instead of pressing;

(3) the embryonic web is transferred by vacuum to a polyester papermaking fabric; and (4) the sheet is then dried by steam on a rotary drum drier.

To a dry 12"×12" handsheet of unmodified papermaking fibers, 28 lb/3000 ft$^2$ basis weight, an aqueous solution of cis-1,2,3,6-tetrahydrophthalic acid and sodium hypophosphite (29 gm/l) at pH 4, is sprayed until 10% (fiber basis) of the acid and 0.5% (fiber basis) of hypophosphite is applied. The handsheet is dried in a forced air oven at room temperature to constant weight. The sheet is then cured in a forced air oven at 180° C. for 30 minutes. The cured sheet is washed in demineralized water at pH 2 and dewatered to 40% consistency. The resultant fibers at 40% consistency are fluffed and ozone oxidized for 30 minutes or one hour at room temperature with a Welsbach Ozone Generator, Model T-816. The fibers are ozone oxidized at an oxygen flow rate of about 8.0 liters/minute and flow pressure of about 8 psig, at a temperature of 0° C. or less.

The 18 lb/3000 ft$^2$ basis weight handsheets prepared from the resultant fibers have tensile strengths such as shown in Table I.

TABLE 1

| Oxidation Time minutes | Total Dry Tensile g/inch | Initial Total Wet Tensile g/inch |
| --- | --- | --- |
| 30 | 593 | 117 |
| 60 | 1389 | 213 |

As shown in Table 1, one hour of oxidation produces a higher initial wet tensile than 30 minutes of oxidation.

Example 2 (paper machine)

A pulp sheet (unrefined NSK fibers, having, e.g., a DP of 1500) having basis weight 260 lb/3000 ft$^2$, is formed on a conventional paper machine (Sandy Hill Manufacture) and wet pressed to 49% solids. A 20% solids aqueous solution of tetrahydrophthalic acid (THPA) and sodium hypophosphite at 60° C. are applied onto the sheet such that a 10% (fiber basis) application of THPA and a 0.5% (fiber basis) application of sodium hypophosphite is achieved. The sheet is then passed through a section of can dryers at 300° F. for 2–3 minutes to dry the sheet and to react the THPA and the fibers to form esterified fibers. The resultant esterified pulp sheets are subsequently treated with ozone for one hour, as described in Example 1. The resultant fibers are formed into a handsheet by conventional methods and apparatus. The paper sheet has a basis weight of 18 lb/3000 ft$^2$, a caliper of 7.4 mils, a density of 0.142 g/cc, a total dry tensile strength of 2106 grams/in, and a total initial wet tensile strength of 586 grams/inch.

A pulp sheet of lightly refined NSK fibers (Canadian Standard Freeness =639 ml; having, e.g., a DP of 1500) having basis weight 260 lb/3000 ft$^2$ is prepared and treated as described in the foregoing paragraph. The resultant treated pulp sheet is ozone oxidized and the resultant fibers are formed into a handsheet as described in the foregoing paragraph. The paper sheet has a basis weight of 18 lb/3000 ft$^2$, a caliper of 8.4 mils, a density of 0.125 g/cc, a total dry tensile strength of 2565 grams/in, and a total initial wet tensile strength of 794 grams/inch.

Comparable handsheets formed from Aspen or SF Ponderosa fibers that have been treated as described for this example have total dry tensile and initial total wet tensile strengths that are significantly less than that obtained for sheets formed from the NSK fibers.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. Aldehyde-modified cellulosic fibers prepared by oxidizing the reaction product of (i) cellulosic fibers having hydroxyl groups and (ii) a 1,2-disubstituted alkene having a carboxylic functional group capable of reacting with said hydroxyl groups, wherein in said reaction product at least a portion of said hydroxyl groups are reacted with said carboxylic group of said alkene to form covalent linkages, said reaction product being oxidized to form aldehyde groups.

2. The modified cellulosic fibers of claim 1 wherein said alkene is a cyclic alkene.

3. The modified cellulosic fibers of claim 1 wherein said alkene has at least two carboxylic functional groups, said carboxylic functional groups being capable of forming an anhydride.

4. The modified cellulosic fibers of claim 3 wherein said carboxylic functional groups of said alkene are positioned 1,2 or 1,3 relative to one another.

5. The modified cellulosic fibers of claim 3 wherein the alkene group and said carboxylic functional groups of said alkene are unconjugated.

6. The modified cellulosic fibers claim 3 wherein said carboxylic functional groups are independently selected from the group consisting of carboxylic acid groups and acid amide groups.

7. The modified cellulosic fibers of claim 6 wherein said carboxylic functional groups are carboxylic acid groups.

8. The modified cellulosic fibers of claim 1 wherein about 0.25 to 1.5 mole %, calculated on a cellulose anhydroglucose molar basis, of said hydroxyl groups of said cellulosic fibers are reacted with said carboxylic functional group of said alkene.

9. A paper product comprising the modified cellulosic fibers of claim 1.

10. aldehyde-modified cellulosic fibers, the fibers comprising the oxidation product of esterified cellulosic fibers, said esterified cellulosic fibers comprising cellulosic fibers having hydroxyl groups and a 1,2-disubstituted alkene having a carboxylic acid group, a portion of said hydroxyl groups being reacted with said carboxylic acid group of said alkene to form ester linkages, said esterified cellulosic fibers being oxidized to form aldehyde groups.

11. The modified cellulosic fibers of claim 10 wherein said alkene is a cyclic alkene.

12. The modified cellulosic fibers of claim 10 wherein said alkene has a carboxylic functional group capable of forming an anhydride with said carboxylic acid group.

13. The modified cellulosic fibers of claim 12 wherein said carboxylic acid group and said carboxylic functional group are positioned 1,2 or 1,3 relative to one another.

14. The modified cellulosic fibers of claim 12 wherein the alkene group and said carboxylic groups of said alkene are unconjugated.

15. The modified cellulosic fibers claim 12 wherein said carboxylic functional group is selected from carboxylic acid groups and acid amide groups.

16. The modified cellulosic fibers of claim 15 wherein said carboxylic functional group is a carboxylic acid group.

17. The modified cellulosic fibers of claim 10 wherein about 0.25 to 1.5 mole %, calculated on a cellulose anhydroglucose molar basis, of said hydroxyl groups of said cellulosic fibers are reacted with said carboxylic acid group of said alkene.

18. A paper product comprising the modified cellulosic fibers of claim 1.

19. Aldehyde-modified cellulosic fibers, the fibers comprising the oxidation product of esterified cellulosic fibers, said esterified cellulosic fibers comprising cellulosic fibers having hydroxyl groups and a 1,2-disubstituted cyclic alkene having two carboxylic functional groups positioned 1,2 or 1,3 relative to one another, said carboxylic functional groups being selected from the group consisting of carboxylic acid groups and acid amide groups, provided that at least one of said carboxylic functional groups is a carboxylic acid group, the alkene group and said carboxylic functional groups of said alkene being unconjugated, about 0.25 to 1.5 mole %, calculated on a cellulose anhydroglucose molar basis, of said hydroxyl groups being reacted with said carboxylic acid group of said alkene to form ester linkages, said esterified cellulosic fibers being oxidized to form aldehyde groups.

20. The modified cellulosic fibers claim 19 wherein said carboxylic functional groups are carboxylic acid groups.

21. The modified cellulosic fibers of claim 19 where said alkene is selected from cis-1,2,3,6-tetrahydrophthalic acid, cis-1,2,3,6-tetrahydrophthalamic acid, and mixtures thereof.

22. The modified cellulosic fibers of claim 19 wherein said esterified cellulosic fibers are oxidized with ozone.

23. A paper product comprising the modified cellulosic fibers of claim 19.

24. A method of making aldehyde-modified cellulosic fibers, the method comprising the steps of:

(a) providing (i) cellulosic fibers having hydroxyl groups and (ii) a fluid mixture of a liquid medium and a 1,2-disubstituted alkene having a carboxylic functional group capable of reacting with cellulosic hydroxyl groups;

(b) contacting the cellulosic fibers with said fluid mixture to form treated fibers;

(c) reacting a portion of said hydroxyl groups of said cellulosic fibers with said carboxylic functional group of said alkene to form covalent linkages to form intermediate cellulosic fibers; and (d) reacting said intermediate cellulosic fibers with an oxidizing agent to form aldehyde groups.

25. The method of claim 24 wherein said steps (b) and (c) comprise the steps of:
   (i) providing a slurry containing the cellulosic fibers and water;
   (ii) depositing the slurry on a formation substrate;
   (iii) setting the fibers into a sheeted form while the fibers are in a substantially unflocculated condition to form a pulp sheet having a consistency of 20–50% and a basis weight of 180–260 lb/3000 ft$^2$;
   (iv) contacting the cellulosic fibers of the pulp sheet with said fluid mixture; and
   (v) reacting a portion of said hydroxyl groups of said cellulosic fibers of the pulp sheet with said carboxylic functional group of said alkene to form covalent linkages to form intermediate cellulosic fibers.

* * * * *

UNITED STATES PATENT AND TRADEMARK OFFICE
CERTIFICATE OF CORRECTION

PATENT NO. : 5,698,688

DATED : December 16, 1997

INVENTOR(S) : David Jay Smith et al.

It is certified that error appears in the above-identified patent and that said Letters Patent is hereby corrected as shown below:

Column 1, line 7, "cellulosie" should read -- cellulosic --.

Column 1, line 67, "et al..," should read -- et al., --.

Column 2, line 64 "thennomechanical" should read -- thermomechanical --.

Column 3, line 49, "coming" should read -- contains --.

Column 4, line 8, "Michel" should read -- Michael --.

Column 5, line 2, after "squeezing" insert -- , --.

Column 6, line 24, "era" should read -- of a --.

Column 7, line 2, "potion" should read -- portion --.

Column 7, line 3, "bending" should read -- bonding --.

Column 7, line 57, "famish" should read -- furnish --.

Column 8, line 29, "formation" should read -- foraminous --.

Column 8, line 34, "formation" should read -- foraminous --.

Column 9, line 17, "mounts" should read -- amounts --.

Column 9, line 40, "Insiron" should read -- Instron --.

Column 10, line 16, "tetrahydrophthalie" should read -- tetrahydrophthalic --.

Column 11, line 66, "aldehyde-" should read -- Aldehyde- --.

UNITED STATES PATENT AND TRADEMARK OFFICE
CERTIFICATE OF CORRECTION

PATENT NO. : 5,698,688

DATED : December 16, 1997

INVENTOR(S) : David Jay Smith et al.

It is certified that error appears in the above-identified patent and that said Letters Patent is hereby corrected as shown below:

Column 12, line 3, "carboxyllc" should read -- carboxylic --.

Column 12, line 48, "where" should read -- wherein --.

Column 13, line 7, "formation" should read -- foraminous --.

Signed and Sealed this

Fourth Day of January, 2000

Attest:

Attesting Officer

Acting Commissioner of Patents and Trademarks